(No Model.) 2 Sheets—Sheet 1.
A. WEBER.
DENTAL ENGINE.
No. 374,221. Patented Dec. 6, 1887.
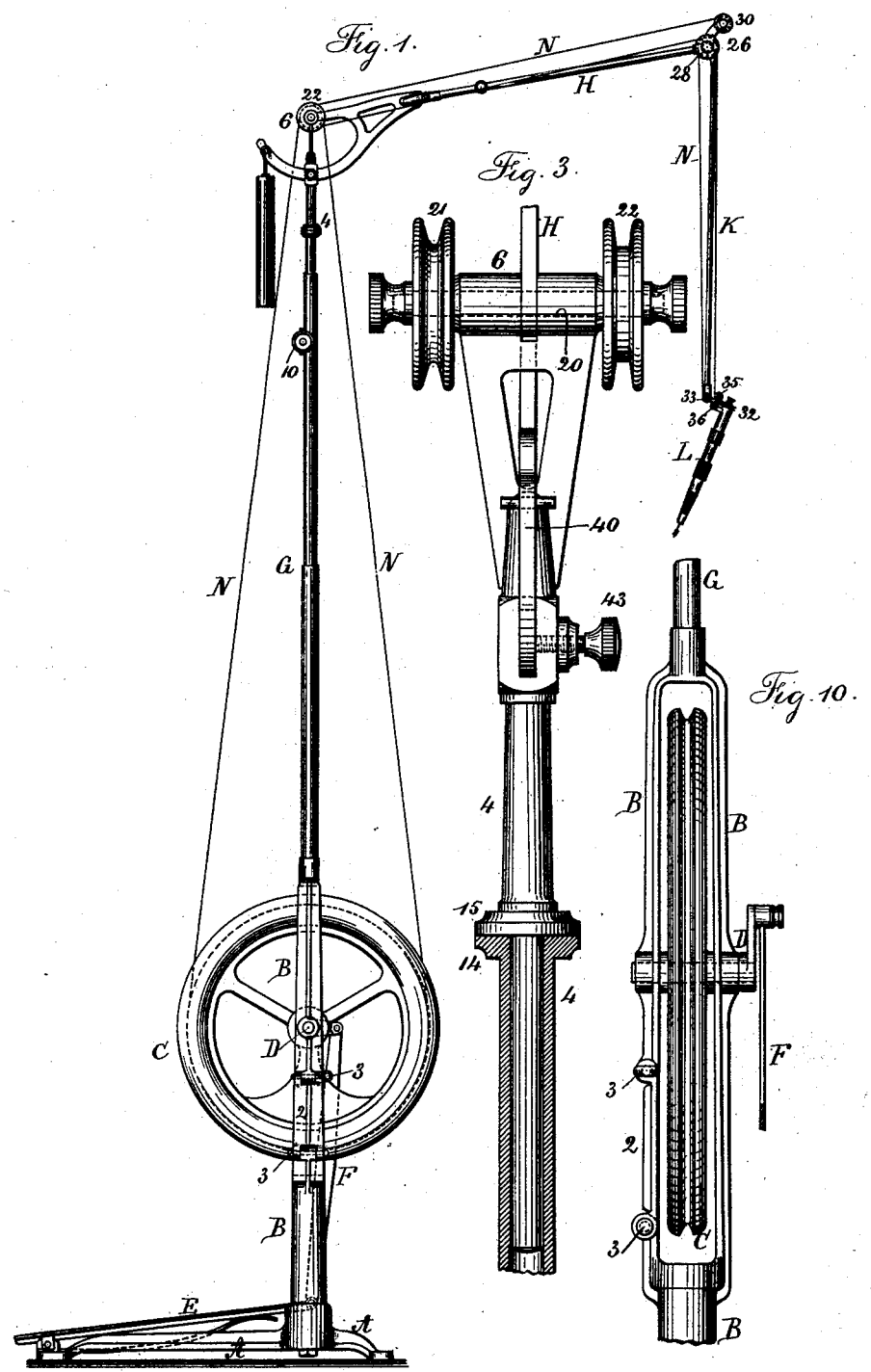
Witnesses:
J. Staib
Chas. H. Smith
Inventor:
August Weber
per Lemuel W. Serrell Atty (No Model.) 2 Sheets—Sheet 2.
A. WEBER.
DENTAL ENGINE.
No. 374,221. Patented Dec. 6, 1887.
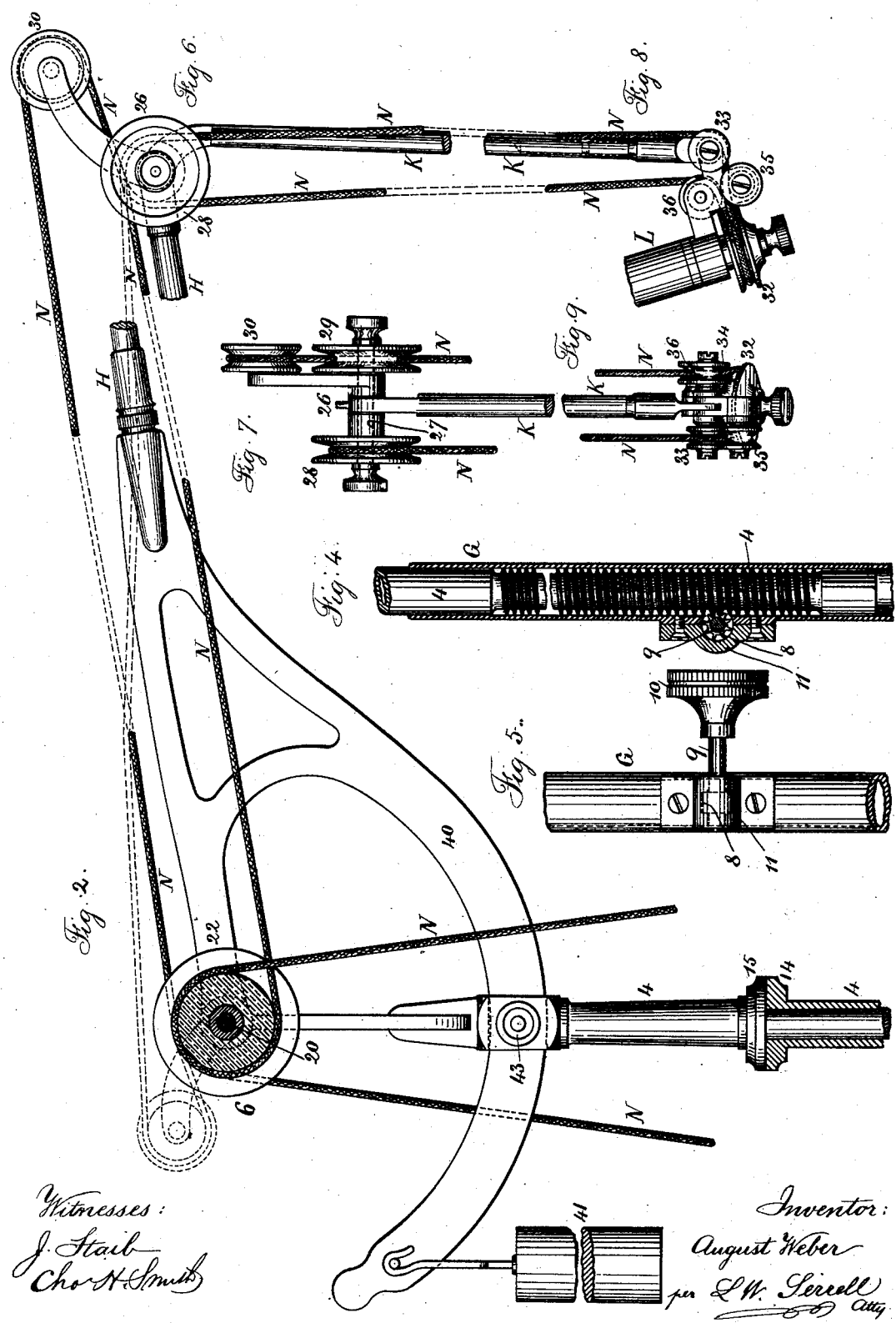

UNITED STATES PATENT OFFICE.

AUGUST WEBER, OF NEW YORK, N. Y., ASSIGNOR TO THE S. S. WHITE DENTAL MANUFACTURING COMPANY, OF PHILADELPHIA, PENNSYLVANIA.

DENTAL ENGINE.

SPECIFICATION forming part of Letters Patent No. 374,221, dated December 6, 1887.

Application filed November 23, 1886. Serial No. 219,542. (No model.)

*To all whom it may concern:*

Be it known that I, AUGUST WEBER, of the city and State of New York, have invented an Improvement in Dental Engines, of which the following is a specification.

Dental engines have heretofore been made with a fly-wheel actuated by a treadle and a vertical standard, to the upper end of which a jointed arm is connected, with a hand-piece and drill or other tool at the end of the outer section of the arm, and an endless cord or belt has passed around the driving-wheel or fly-wheel and over pulleys at the joints between the standard and the arm, and also over pulleys between the sections of the arm and of the hand-piece.

In consequence of the motion given to the hand-piece in properly placing it for operation, the belt is liable to become slack or too tightly strained. Efforts have been made to compensate this difference in the tension of the belt by placing the joints between the respective parts of the arm at a distance from the axis of the pulleys; but this is not accurate in its operation, because in certain positions the belt will be wound farther upon the pulley than in other positions, and the uniformity of tension will not be maintained.

My improvement relates to the combination, with the standard and the arm that is jointed thereto, of pulleys over which the endless cord is passed, the axis of the pulleys coinciding with the center of the joint, and the endless cord passing over one pulley in one direction and the other pulley in the opposite direction, so that when the arm is raised or lowered in relation to the standard one part of the endless cord is wound upon the pulley to exactly the same extent that the other part of the endless cord is wound off the pulley. Thereby the absolute uniformity of tension is maintained; and with the joint in the arm and with the joint between the arm and the hand-piece idler-pulleys are made use of, so as to allow for the endless cord or band passing in the opposite direction, for the purposes before mentioned; and I make use of a standard that is provided with an adjustment for tightening the cord to whatever extent may be desired.

In the drawings, Figure 1 is a general elevation of the dental engine. Fig. 2 is an elevation of the top of the standard and a part of the arm that is jointed thereto. Fig. 3 is an elevation of the same at right angles to Fig. 2, the weight and cord being removed. Fig. 4 is a sectional elevation of the pinion and movable portion of the standard. Fig. 5 is an elevation of the cap over the pinion upon the standard. Fig. 6 is a side view of the joint between the two sections of the arm. Fig. 7 is an elevation of the same endwise of the arm. Fig. 8 is a side view of the parts of the junction of the hand-piece with the arm. Fig. 9 is an elevation of the parts endwise of the hand-piece, and Fig. 10 is a detached view of the slotted standard carrying the fly-wheel in larger size than Fig. 1.

The base A is usually triangular, and from the middle thereof the standard B rises, and it is adapted to receive the fly-wheel C and its crank-shaft D, as usual, and the treadle E and connecting-rod F are used to drive the fly-wheel. The tubular standard G rises above the standard B, and the arm is made of two parts, H and K, that are jointed together, and the part H is united by a joint to the top end of the standard G, and the hand-piece L is jointed to the end of the section K. These parts are of the general character heretofore in use, except in the particulars hereinafter named, and I remark that the hand-piece L is to be of any desired character, and the central shaft thereof operates a plugger, a drill, an angle-piece, or any other tool to which the hand-piece is adapted. The belt N is endless and of any desired material, and it is to be passed around the fly-wheel and over the pulleys to the hand-piece; but it is advantageous to be able to take the belt off or put the same on with facility without cutting or opening the endless belt N. To provide for so doing, I make the standard B with a removable section, 2, at one side of the fly-wheel, and at the ends of this section there are lugs that receive through them the cross-pins 3, so that when in place this section closes the opening that there would otherwise be in one side of the two-part standard or inclosing-frame, and the two sides of the standard are rendered uniform, or nearly so, in strength; but when the pins 3 are pulled out the section 2 can be removed and the endless belt removed or inserted so as to pass properly around the flywheel. The section may be swung open by removing one of the pins.

At the top of the tubular standard G there is received an axial rod or tube, 4, that may be moved endwise to raise or lower the joint 6, that connects the arm H; and I make use of the pinion 8, that is upon a horizontal shaft, 9, with a thumb-wheel, 10, at the end, by which the pinion is revolved to raise or lower the rod 4. There is a block upon the side of the standard G, with a cap, 11, secured by screws, so that the necessary friction can be obtained to prevent the pinion turning by the weight that is supported by it.

The teeth of the pinion gear into teeth upon the rod 4, and I prefer to make these teeth by a screw-thread cut into the surface of said rod 4, so that the rack will not be liable to wear out, and the rod can be revolved, as the arm H is swung, without the teeth becoming separated from the teeth of the pinion; and in addition to this the standard can be lengthened or shortened by rotating the rod 4 and its screw-thread teeth, the pinion in that case forming a nut for the same. I prefer to make this rod 4 in two parts, as seen in Figs. 2 and 3, one part being tubular to receive the other part, there being bearing-disks 14 and 15 upon the respective parts, so that lubricating material can be introduced between these bearing-disks to allow the arm H to swing, when in use, with but little friction. The joint-pin 20 of the joint 6 is preferably extended to form the shaft or gudgeon for the pulleys 21 22, that are grooved for the endless cord to pass around. The endless cord passes simply up over the pulley 21; but in order to pass in the opposite direction around the pulley 22 it is wound almost around the same, as seen in Fig. 2. It will now be evident that if, for illustration, the endless cord were tied fast to the arm H, where it passes along at the sides thereof and the cord properly tightened by the pinion 8, the arm H can be swung up or down without tightening or loosening the cord or band, because it will be wound upon the pulley 22 to exactly the same extent as it is unwound off the pulley 21, or vice versa. The fly-wheel, however, will be slightly turned as the cord gives down on one side and is drawn up on the other side. Of course the same effect takes place when the engine is running—that is to say, the cord or belt is not tightened or loosened by the movement of the arm H up or down. At the joint 26 between the arm-sections H and K the joint-pin 27 becomes the shaft for the pulleys 28 and 29, and the cord goes above one pulley and below the other pulley, so as to act in the same manner as has been described with reference to the pulleys 21 22; but to lessen wear upon the band that would result from the rubbing of one part of the band against the other in passing entirely around the pulley 29, I prefer to lead the band or cord over the idler-pulley 30, and thence down over and beneath the pulley 29, the action of the parts being identically the same, and the object of the idler 30 being only to prevent or lessen wear upon the band or cord.

It will be evident that an idler-pulley might be used in connection with the pulley 22, to prevent the rubbing of one part of the band against the other at the place where it crosses. This idler is indicated by dotted lines in Fig. 2. In each instance the idler is supported by an arm or branch extending out from the arm H.

At the rear end of the hand-piece is a pulley, 32, around which the endless band passes, and by which motion is given to the drill or other instrument at the end of the hand-piece, as usual; and the pivot-pin of the hinge that unites the arm K to the hand-piece is in line with or extended to form the shaft or gudgeons for the pulleys 33 and 34, and the cord or band passes at one side of the pulley 33 and at the other side of the pulley 34, in order that the band may not be slackened or tightened by the swinging of the hand-piece upon the joint by which it is connected to the arm K; and in order to guide the belt in passing around the pulley 32, I make use of the guide-pulleys 35 and 36, that are placed almost in contact with the respective pulleys 33 and 34, and in such positions that the band will be properly guided to the pulley 32, the distance between the respective pulleys 33 and 35 and 34 and 36 being only sufficient for slipping in the cord or band. It will now be apparent that when the hand-piece is moved to an acute angle with the arm K the cord or band will be wound farther upon the pulley 33, and it will be unwound from the pulley 34 to the same extent, and if the movement toward the arm K be continued the cord will leave the pulley 34 and bear only upon the pulley 33, and on the other hand, if the hand-piece assumes an obtuse angle to the arm K, the cord will be wound more upon the pulley 34 and partially unwound from the pulley 33, and by the further movement will leave the pulley 33 and be further wound around the pulley 34. In any instance, the winding and unwinding being in the opposite direction on one side from what it is on the other side, the cord or band will not be tightened or slackened, but will be maintained at a uniform tension.

It is usual to connect the hand-piece by a swivel with the arm H, so that the hand-piece may be partially rotated upon the swivel as said hand-piece is turned in the necessary direction for operating the tool. This, however, does not materially interfere with the tension of the cord or band, because the angle that the cord or band assumes in relation to the arm H is but slight.

Below the arm H and connected with the same is a sector, 40, passing through a mortise in the upper part of the standard and extending sufficiently to the rear for receiving the counterpoise 41, by which the weight of the arm H and the parts connected therewith are balanced; and it is preferable to have the weight sufficiently heavy to cause the outer end of the arm H to rise when not otherwise acted upon, as this facilitates the use of the hand-piece. The clamping-screw 43 is employed for holding the sector and the arm H at a fixed angle to the standard whenever so desired.

It will be observed that I have shown the driving belt or cord wound about one of the coincident pulleys at the top of the standard, in order to gain the effect of the third idler or guide pulley shown at the other joints, therefore virtually making one of the belt-pulley the third pulley or guide also for the belt or cord, and they are equivalents with the belt so wound. The third or idler pulley is simply a guide for the belt or cord to keep it in proper relation to the coincident pulleys.

I claim as my invention—

1. The forked standard or inclosing-frame fitted with bearings for the pulley thereof, and having a removable section and securing device therefor, substantially as described, whereby the endless cord may be inserted in the groove of said inclosed pulley and readily removed while the pulley is inclosed in operation, as before set forth.

2. The combination, with the tubular standard of a dental engine and the extension rod or section thereof having teeth or threads thereon, of the pinion-wheel mounted on said standard and engaging said teeth to raise and lower said extension-rod, and the operating-shaft of said pinion, substantially as described.

3. In a belt-compensating device, the combination of two jointed arms and two pulleys, the axes of which are coincident with the joints of said arms, and a third belt pulley or guide, substantially as described.

4. The combination of the engine-standard, the jointed arms thereof, the pulleys coincident with the joints of said arms, and the endless driving belt or cord passing over one and under the other of the coincident pulleys, substantially as described.

5. The combination, with the engine-standard and the lateral arm H, jointed to said standard, of the segment of said lateral arm and the counterpoise of said segment, substantially as described.

Signed by me this 4th day of October, 1886.

AUGUST WEBER.

Witnesses:
 GEO. T. PINCKNEY,
 WILLIAM G. MOTT.